United States Patent [19]
Toriyama et al.

[11] Patent Number: 5,935,888
[45] Date of Patent: Aug. 10, 1999

[54] POROUS SILICON NITRIDE WITH RODLIKE GRAINS ORIENTED

[75] Inventors: Motohiro Toriyama; Kiyoshi Hirao; Manuel E. Brito; Syuzo Kanzaki; Yasuhiro Shigegaki, all of Aichi, Japan

[73] Assignees: Japan as represented by Director General of Agency of Industrial Science and Technology; Fine Ceramics Research Association, both of Tokyo, Japan

[21] Appl. No.: 08/848,224

[22] Filed: Apr. 29, 1997

[30] Foreign Application Priority Data

Apr. 30, 1996 [JP] Japan ..................................... 8-134341

[51] Int. Cl.$^6$ .................................................. C04B 35/584
[52] U.S. Cl. ........................... 501/97.1; 501/80; 501/97.2
[58] Field of Search .................................. 501/97.1, 97.2, 501/80

[56] References Cited

U.S. PATENT DOCUMENTS

| | | | |
|---|---|---|---|
| 4,886,767 | 12/1989 | Goto et al. | 501/97.2 |
| 5,171,723 | 12/1992 | Moriguchi et al. | 501/97.2 |
| 5,229,046 | 7/1993 | Watanabe et al. | 501/80 |
| 5,618,765 | 4/1997 | Takeuchi et al. | 501/97.1 |
| 5,696,042 | 12/1997 | Matsuura et al. | 501/97.1 |
| 5,705,449 | 1/1998 | Hirao et al. | 501/97.2 |
| 5,750,449 | 5/1998 | Niihara et al. | 501/97.1 |
| 5,780,374 | 7/1998 | Kawai et al. | 501/97.2 |

OTHER PUBLICATIONS

Journal of Ceramic Society of Japan, vol. 97, No. 8, pp. 872–874, 1989, Yoshio Ukyo, et al., "High Strenth $Si_3N_4$ Ceramics".

Journal of the Ceramic Society of Japan, vol. 103, No. 4 pp. 407–408, 1995, Masashi Yoshimura, et al., "Grain Size Controlled High–Strength Silicon Nitride Ceramics".

*Primary Examiner*—Karl Group
*Attorney, Agent, or Firm*—Oblon, Spivak, McClelland, Maier & Neustadt, P.C.

[57] ABSTRACT

An object of the present invention is to provide a high-porosity, high-strength porous silicon nitride having great tolerance with respect to strain and stress, and a method for producing the same, and the present invention relates to a high-porosity, high-strength porous silicon nitride having great tolerance with respect to strain and stress, characterized in that rodlike grains of silicon nitride with a minor diameter of 0.5 to 10 μm and an aspect ratio of 10 to 100 are oriented in a single direction, and the rest of the structure other than the rodlike grains consists solely of pores with a porosity of 5 to 30%, and further the above-mentioned porous silicon nitride is produced by mixing rodlike particles of silicon nitride with a minor diameter of 0.5 to 10 μm and an aspect ratio of 10 to 100 as the silicon nitride with an auxiliary that serves to bind the rodlike particles, forming a tape in which the silicon nitride rodlike particles are oriented in a single direction by sheet forming, extrusion forming, or another such forming process, and sintering this product in a nitrogen atmosphere after lamination and degreasing of it.

3 Claims, 6 Drawing Sheets

POROUS SILICON NITRIDE WITH RODLIKE GRAINS ORIENTED

DESCRIPTION OF THE INVENTION

The present invention relates to a high-porosity, high-strength porous silicon nitride having great tolerance with respect to strain and stress, and to a method for production thereof. More particularly, the present invention relates to a novel porous silicon nitride that contains pores and has a lower modulus of elasticity while maintaining a higher strength than an ordinary solid silicon nitride ceramic, and that has an extremely great tolerance with respect to strain and stress, and to a method for production thereof. The porous silicon nitride material of the present invention can be easily incorporated into a mechanism which requires mechanical strength and in which there is a marked difference in the coefficient of thermal expansion and the modulus of elasticity between different members. Also, it is possible to take advantage of the low density resulting from the pores contained in the material, and use this material favorably as a rotary machine part in which the density of the material directly affects the centrifugal stress that is generated, such as a gas turbine.

BACKGROUND OF THE INVENTION

When a ceramic is used as a structural material, the structure must be a combination with another material, such as one based on a metal. With a combination structure such as this, a strain differential occurs as a result of the difference in the thermal and mechanical properties of the ceramic and the other material. In particular, this strain differential causes stress that bears on stationary parts under harsh binding conditions, and also causes the fracture that originates in this stress. Increasing the breaking strain of a material is effective at avoiding this type of ceramic fracture.

In the past, increased strength was essential to an increase in breaking strain. The following are a few examples of the disclosure of typical technology developed with this goal in mind.

Higher strength in a silicon nitride ceramic has been achieved by preventing defects from being introduced in the manufacturing process and by reducing the size of the particles. For example, as seen in "Journal of the Ceramic Society of Japan, 103[4], pp. 407–408 (1995)," there have been reports of the development of materials with high strength by adding a sintering auxiliary that inhibits grain growth and carefully performing the sintering at a temperature at which particles will not grow. Also, as seen in "Journal of the Ceramic Society of Japan, 97, pp. 872–874 (1989)," high-strength silicon nitride has been obtained by blending in as a sintering auxiliary a component that becomes a solid solution inside the silicon nitride particles during sintering, and simultaneously controlling sintering and dissolution of it.

The above methods have the following drawbacks, however, and a solution to these problems urgently needs to be found.

Extremely precise process control, as seen in the above example, is necessary in order to prevent defects from being introduced in the manufacturing process and to reduce the size of the particles. For instance, as seen in "Progress and Results of Next-Generation Research and Development of Fine Ceramics, Edited by the Fine Ceramics Research Association," increasing strength requires a thorough investigation into many factors, as well as repeated and tremendous quantities of experimentation and analysis to find solutions one after another. Because of this, greater breaking strain through increased strength poses problems in terms of higher cost and inferior reproducibility, which is a major obstacle to industrial utilization.

In the midst of this situation, the inventors conducted research with the above-mentioned prior art in mind and with the aim being the development of a silicon nitride whose strength would be maintained and would not depend on the manufacturing process, whose modulus of elasticity would be decreased, and whose breaking strain would be increased. In particular, increasing the breaking strain by lowering the modulus of elasticity is an important point not found in the above examples, and this offered the possibility of an easy solution to the problems that could not be solved with prior art.

There are two methods for lowering the modulus of elasticity of a ceramic. One method is to control the elastic behavior inherent in a ceramic substance, such as the formation of a solid solution. Since this method involves the control of the inherent characteristics of a substance, it is a universal control method, but there is a limit to how much the modulus of elasticity can be lowered since the solid solution system and solid solution amount are limited with a ceramic, and particularly the silicon nitride that is the object material of the present invention, which has strong covalent bonds. The other method is to compound a low modulus phase. The goal with a conventional compound material was to compound a strengthening phase whose modulus of elasticity and strength were both higher than those of the matrix, and to increase strength and toughness. However, when a low modulus phase is compounded, since the strength of a low modulus phase is generally low, the application of a common compounding rule to strength results in a decrease in strength along with the modulus of elasticity of the compound material.

In view of this, the inventors attempted the production of a high-strength porous silicon nitride in which the backbone consisted solely of oriented rodlike grains of silicon nitride, which are effective at increasing the strength of silicon nitride, and the other portion consisted solely of pores, which are effective at lowering the modulus of elasticity. The orientation of the rodlike grains is accompanied by the pores in the porous structure of the present invention being oriented in the same way as the grains, so there are fewer defects that would hinder strength manifestation than with ordinary spherical pores or the like. As a result, the present invention was perfected upon discovering that higher strength through the orientation of the rodlike grains can be realized simultaneously with a lower modulus of elasticity through the introduction of pores, and that breaking strain can be greatly increased.

Furthermore, as a result of in-depth investigation, it was discovered that the rodlike grains in the porous silicon nitride must have a minor axis diameter of 0.5 to 10 μm and an aspect ratio of 10 to 100, and the porosity must be controlled to between 5 and 30% for a low modulus of elasticity and high strength to be manifested.

The porous material pertaining to the present invention has a structure in which the pores, which tend to be the fracture starting point, which is the most important aspect in the fracture of a ceramic, are supported by oriented rodlike grains. It was found that, as a result, the common compounding rule applies to the modulus of elasticity, but does not apply to strength, and strength can generally be maintained despite the introduction of pores that have an adverse effect on strength.

SUMMARY OF THE INVENTION

An object of the present invention is to provide a high-porosity, high-strength porous silicon nitride having great tolerance with respect to strain and stress, and a method for production thereof.

The present invention relates to a high-porosity, high-strength porous silicon nitride having great tolerance with respect to strain and stress, characterized in that rodlike grains of silicon nitride with a minor diameter of 0.5 to 10 μm and an aspect ratio of 10 to 100 are oriented in a single direction, and the rest of the structure other than the rodlike particles consists solely of pores with a porosity of 5 to 30%.

The above-mentioned porous silicon nitride is produced by the processes that comprises of mixing rodlike particles of silicon nitride with a minor diameter of 0.5 to 10 μm and an aspect ratio of 10 to 100 as the silicon nitride with an auxiliary that serves to bind the rodlike particles, forming a tape in which the silicon nitride rodlike particles are oriented in a single direction by sheet forming, extrusion forming, or another such forming process, and sintering this product in a nitrogen atmosphere after lamination and degreasing of it.

The porous silicon nitride of the present invention can be easily incorporated into a mechanism which requires mechanical strength and in which there is a marked difference in the coefficient of thermal expansion and the modulus of elasticity between different members. Also, it is possible to take advantage of the low density resulting from the pores contained in the material, and use this material favorably as a rotary machine part in which the density of the material directly affects the centrifugal stress that is generated, such as a gas turbine.

DETAILED DESCRIPTION OF THE INVENTION

An object of the present invention is to provide a high-porosity, high-strength porous silicon nitride material having great tolerance with respect to strain and stress, and a method for production thereof.

Another object of the present invention is to provide a novel porous silicon nitride that contains pores and has lowered elasticity while maintaining a higher strength than an ordinary solid silicon nitride ceramic, and that has an extremely great tolerance with respect to strain and stress, and a method for production thereof.

The present invention, which is intended to solve the above-mentioned problems, relates to a high-porosity, high-strength porous silicon nitride having great tolerance with respect to strain and stress, characterized in that rodlike grains of silicon nitride with a minor diameter of 0.5 to 10 μm and an aspect ratio of 10 to 100 are oriented in a single direction, and the rest of the structure other than the rodlike grains consists solely of pores with a porosity of 5 to 30%.

The present invention also relates to a method for producing the above-mentioned silicon nitride, characterized in the processes that comprises of mixing rodlike particles of silicon nitride with a minor diameter of 0.5 to 10 μm and an aspect ratio of 10 to 100 as the silicon nitride with an auxiliary that serves to bind the rodlike particles, forming a tape in which the silicon nitride rodlike particles are oriented in a single direction by sheet forming, extrusion forming, or another such forming process, and sintering this product in a nitrogen atmosphere after lamination and degreasing of it.

The present invention will now be described in further detail.

The method of the present invention for producing a high-strength, high-porosity porous silicon nitride is as follows.

(1) Using only silicon nitride rodlike particles, a slurry is prepared by mixing these with an auxiliary that serves to bind the rodlike particles.

(2) A tape in which the silicon nitride rodlike particles are oriented in a single direction is formed by sheet forming, extrusion forming, or another such forming process, and then laminated.

(3) The formed article thus obtained is degreased and then sintered in a nitrogen atmosphere.

The first step in producing the high-strength, high-porosity porous silicon nitride pertaining to the present invention is to add a specific amount of a rodlike particle binding auxiliary to the silicon nitride rodlike particles. The raw material silicon nitride rodlike particles may have a crystal system that is either α-type, β-type, or amorphous, but particles with a minor diameter of 0.5 to 10 μm and an aspect ratio of 10 to 100 are used. The size of these rodlike particles is an important factor that determines the shape and volumetric percentage of the pores that remain after sintering. $MgO$, $CaO$, $Al_2O_3$, $Y_2O_3$, $Yb_2O_2$, $HfO_2$, $Sc_2O_3$, $CeO_2$, $ZrO_2$, $SiO_2$, $Cr_2O_3$, $AlN$, and other such commonly used compounds can be used as the rodlike particle binding auxiliary, but it is preferable for yttrium oxide, aluminum oxide, or the like to be contained.

α-type and β-type ordinary spherical silicon nitride powders can also be used as desired.

The combination and added amount of the rodlike particle binding auxiliary will vary with the sintering conditions, such as the sintering temperature and duration and the nitrogen gas pressure during sintering, but are selected for each set of sintering conditions such that (1) the portion other than the rodlike grains will consist solely of pores with a porosity of 5 to 30% and (2) the silicon nitride rodlike grains will be oriented in a single direction. If the porosity is less than 5%, the low modulus of elasticity that is an object of the present invention cannot be realized, and an ordinary solid silicon nitride with high strength and a high modulus of elasticity will result. On the other hand, if the porosity is over 30%, there will be fewer bonds between the rodlike grains, and the strength will be markedly reduced.

An ordinary machine used in the mixing or kneading of powders can be used in the mixing of these raw materials.

In this case, either a dry or a wet process may be used, but wet mixing is preferable. Water, methanol, ethanol, toluene, or another such solvent is used in this wet mixing, but the use of an organic solvent is preferable in order to suppress the oxidation of the silicon nitride. When an organic solvent is used, the mixing can be performed more effectively by using cationic cellulose or another such dispersant.

A suitable amount of an organic binder is then added to and mixed with the mixed slurry obtained above, after which this mixture is formed into a green formed article by extrusion forming or by sheet forming by doctor blade method or the like in order to orient the grains. In particular, when sheet forming is performed, heating and press bonding are performed after the forming in order to obtain the specified thickness.

The above-mentioned formed article is then calcined by a standard method of heating at a temperature of about 600 to 1000° C. to remove the forming binder, and this product is sintered in nitrogen of 1 to 200 atm at a temperature of 1700 to 2000° C. Here, it is important that the sintered sample have a porosity between 5 and 30%, and that the rodlike grains be oriented in a single direction so that high strength and high porosity will both be manifested.

The high-strength, high-porosity porous silicon nitride obtained in this manner has a microstructure in which the rodlike grains are oriented in a single direction, and the area around these rodlike grains consists solely of pores. The pores have a shape that is elongated in the direction of orientation of the rodlike grains, their size is extremely uniform at approximately 10 $\mu$m, and the rodlike grains are supported in the pores in the orientation direction. As a result, the pores have an independent, fine structure that does not become a fracture starting point, which is the most important aspect of ceramic fracture, and high strength is displayed with respect to the orientation direction of the grains and pores.

With the present invention, it is possible to obtain a high-strength, high-porosity porous silicon nitride which, despite containing pores at a porosity of 5 to 30%, has strength with respect to the orientation direction of the grains and pores of at least 1000 MPa, and has a modulus of elasticity that has been decreased through the introduction of pores.

EXAMPLES

The present invention will now be described in specific terms on the basis of examples, but the present invention is in no way limited by these examples.

EXAMPLE 1

(1) Tape Production 5 wt % yttrium oxide and 2 wt % aluminum oxide added as rodlike particle binders, β-type silicon nitride rodlike particles (minor diameter of 1 $\mu$m, aspect ratio of 30), a liquid mixture of toluene and butanol (4/1) as the dispersion medium along with the binder were mixed to produce a slurry. This slurry was used to produce a tape with a thickness of 100 $\mu$m by tape forming, which was to be used as a dense layer.

(2) Production and Sintering of Laminate 100 of the tapes produced above were laminated and press bonded to produce a laminate. This formed article was subjected to a CIP treatment, degreased and then sintered for 6 hours at 1850° C. in a 10 atm nitrogen atmosphere.

(3) Structure of Porous Material

Figure 1:
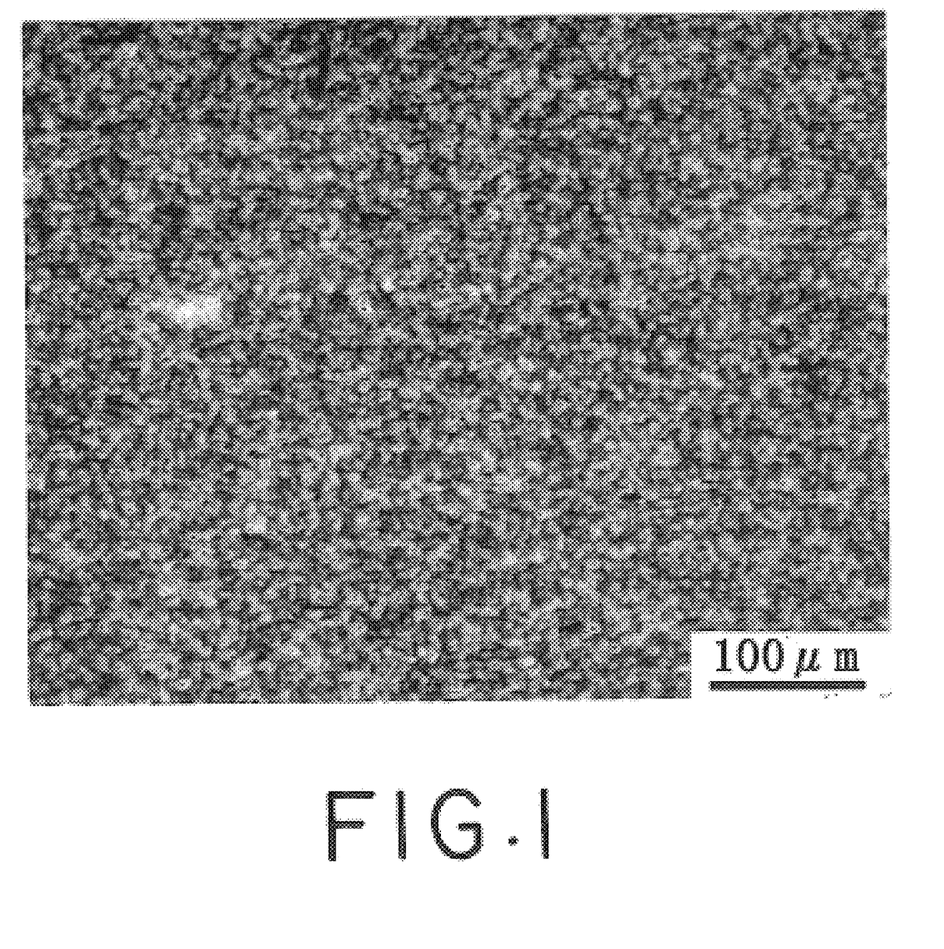
FIG. 1 is a photograph of etched surface of the porous silicon nitride (a photograph of the texture of the ceramic material) in Example 1 of the present invention.
Figure 2:
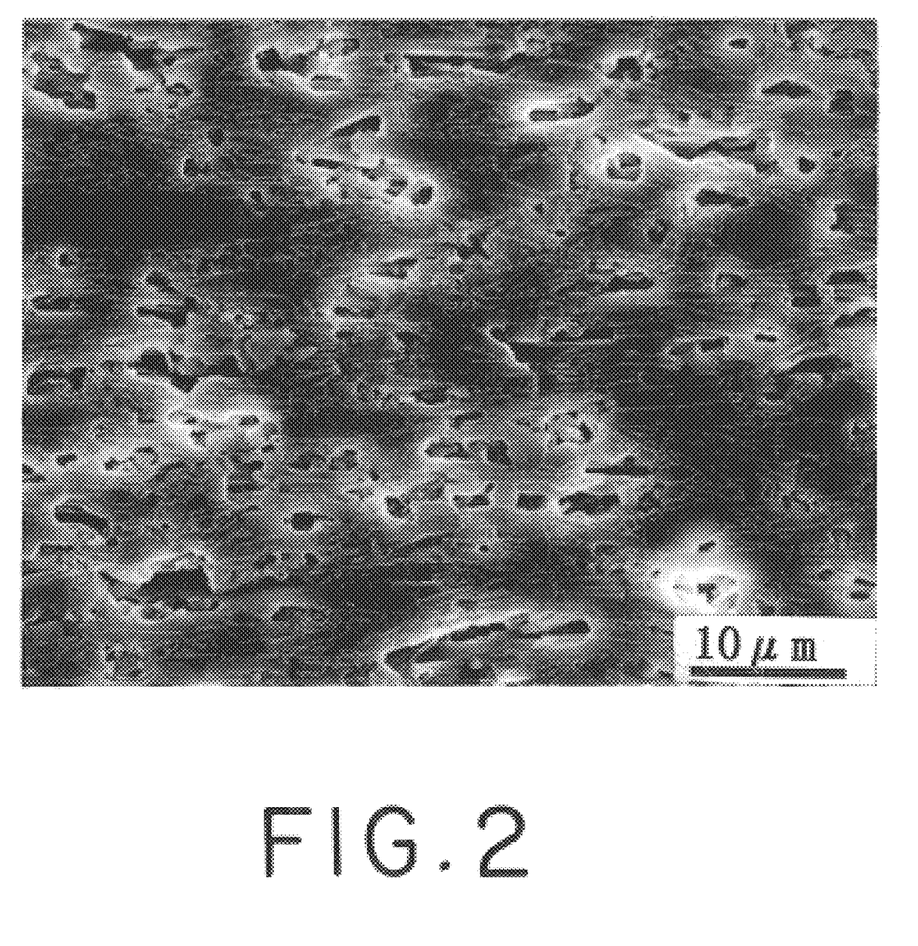
FIG. 2 is a photograph of the etched surface of porous silicon nitride (a photograph of the texture of the ceramic material) in Example 1 of the present invention.
Figure 3:
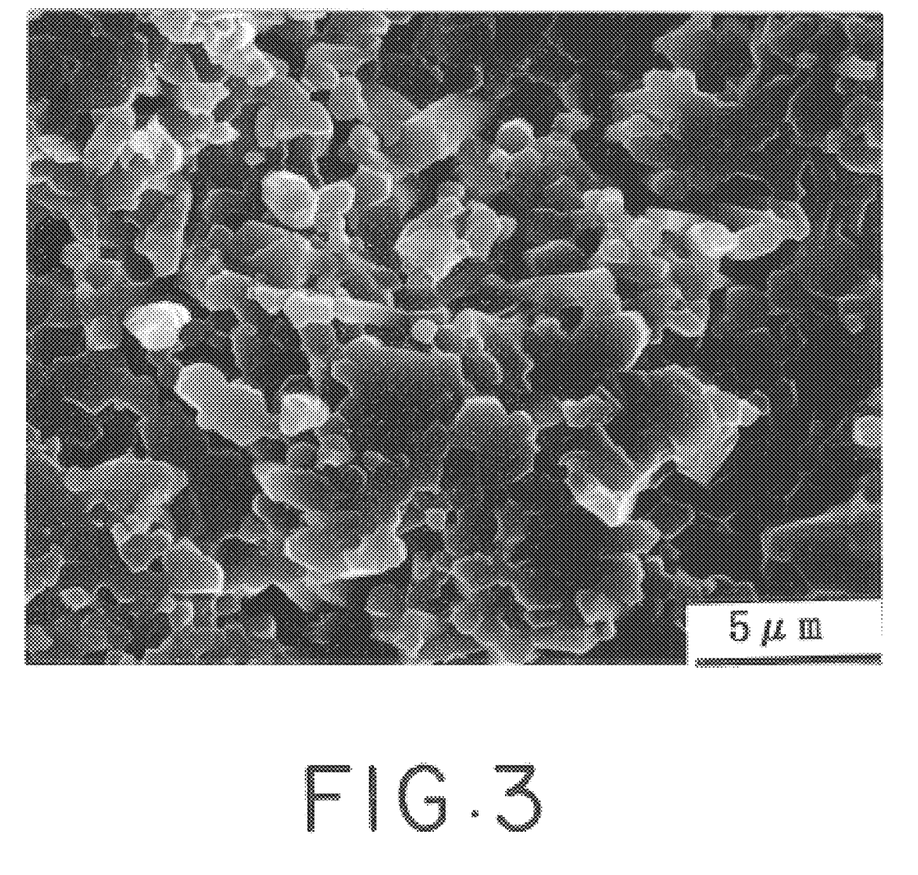
FIG. 3 is a photograph of fracture surface of the porous silicon nitride (a photograph of the texture of the ceramic material) in Example 1 of the present invention.

FIG. 1 is a photograph of a polished and etched cross section of the porous silicon nitride obtained above. The rodlike grains are oriented horizontally in the photograph, and this results in the pores also having an elongated shape. FIG. 2 is a photograph of the same under higher magnification, and it can be seen that the size of the pores is approximately 10 $\mu$m and is extremely uniform, and that the rodlike grains are supported in the pores in the orientation direction. FIG. 3 is a high magnification photograph of a fracture surface of it. The rodlike grains share hexagonal sides or angles in cross section, and are firmly bonded together.

EXAMPLE 2

(1) Tape Production

To β-type silicon nitride rodlike particles (minor diameter of 1 $\mu$m, aspect ratio of 30), 5 wt % yttrium oxide and 2 wt % aluminum oxide as rodlike particle binders, 30 wt % α-type silicon nitride powder (containing at least 95 wt % α-type) were added, and then a tape was produced in the same manner as in Example 1.

(2) Production and Sintering of Laminate 100 of the tapes produced above were laminated and press bonded to produce a laminate. This formed article was subjected to a CIP treatment, degreased and then sintered for 6 hours at 1850° C. in a 10 atm nitrogen atmosphere.

(3) Structure of Porous Material

Figure 4:
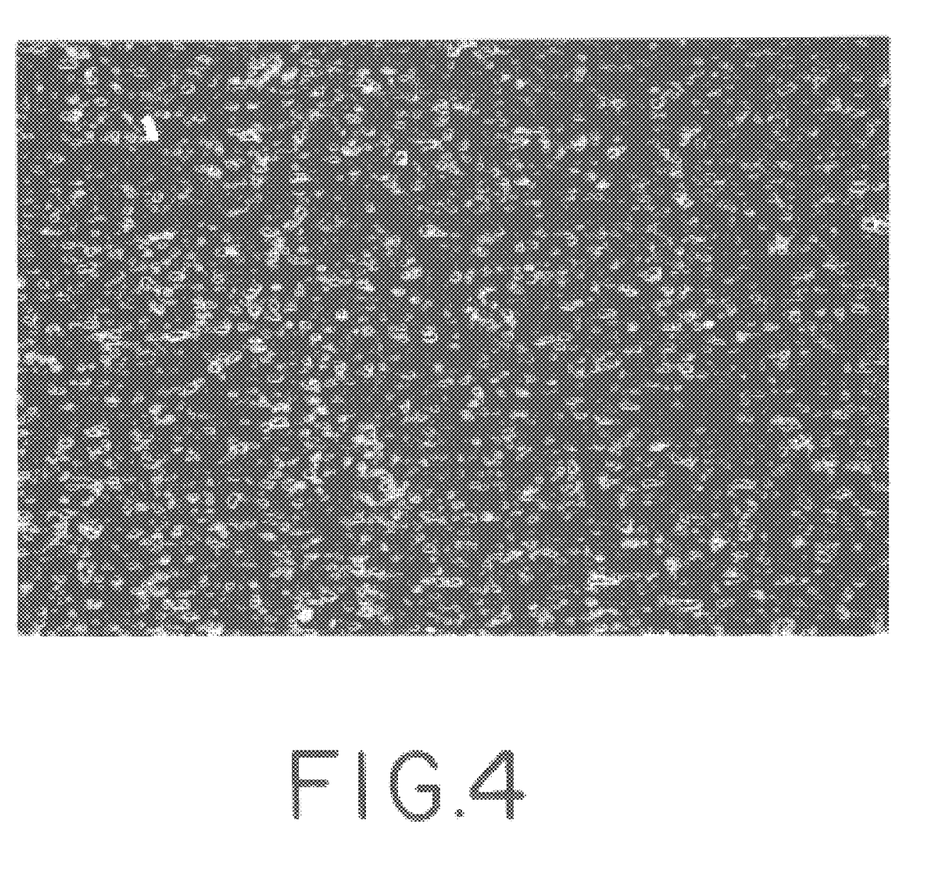
FIG. 4 is a photograph of the etched surface of porous silicon nitride (a photograph of the texture of the ceramic material) in Example 2 of the present invention.
Figure 5:
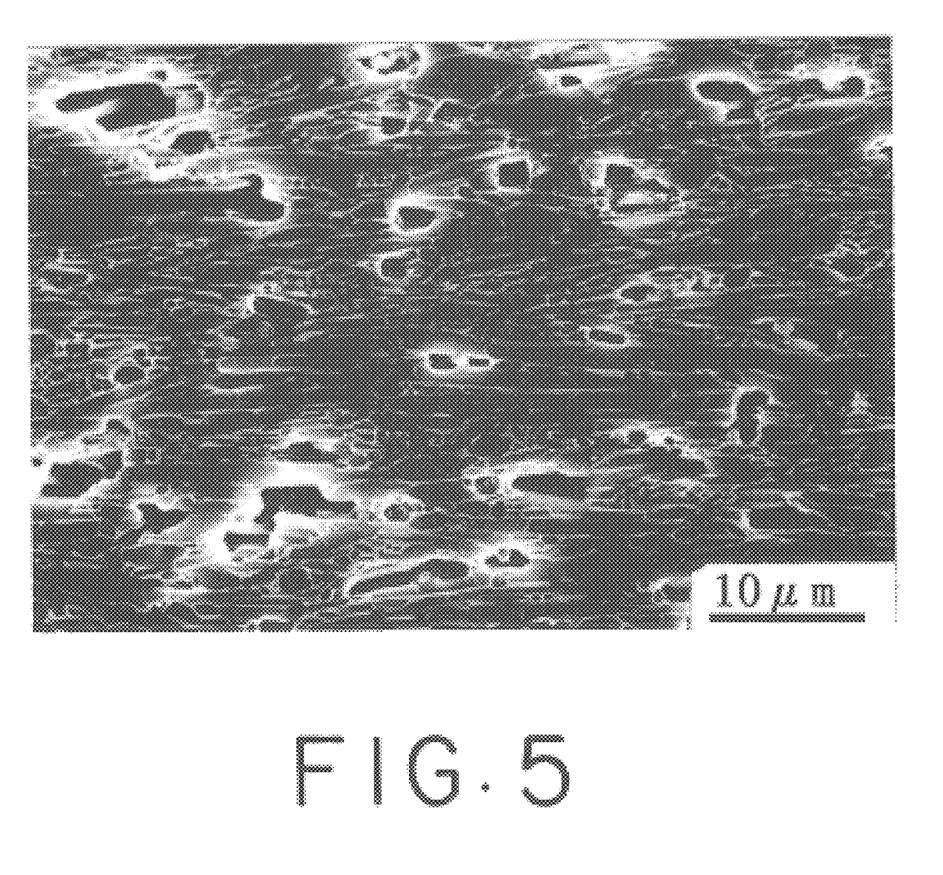
FIG. 5 is a photograph of the etched surface of porous silicon nitride (a photograph of the texture of the ceramic material) in Example 2 of the present invention.

FIG. 4 is a photograph of a polished and etched cross section of the porous silicon nitride obtained above, and FIG. 5 is a high magnification photograph. It can be seen that the texture is the same as in Example 1, but there are fewer pores. Also, the rodlike grains have grown larger as a result of the addition of α-type silicon nitride.

COMPARATIVE EXAMPLE (1) Tape Production

To an α-type silicon nitride powder (containing at least 95 wt % α-type), 5 wt % yttrium oxide and 2 wt % aluminum oxide as sintering auxiliaries, 30 wt % α-type silicon nitride powder (containing at least 95 wt % α-type) were added, and then a tape was produced in the same manner as in Example 1.

(2) Production and Sintering of Laminate 120 of the tapes produced above were laminated and press bonded to produce a laminate. This formed article was subjected to a CIP treatment, degreased and then sintered for 6 hours at 1850° C. in a 10 atm nitrogen atmosphere.

(3) Structure of Sinter

Figure 6:
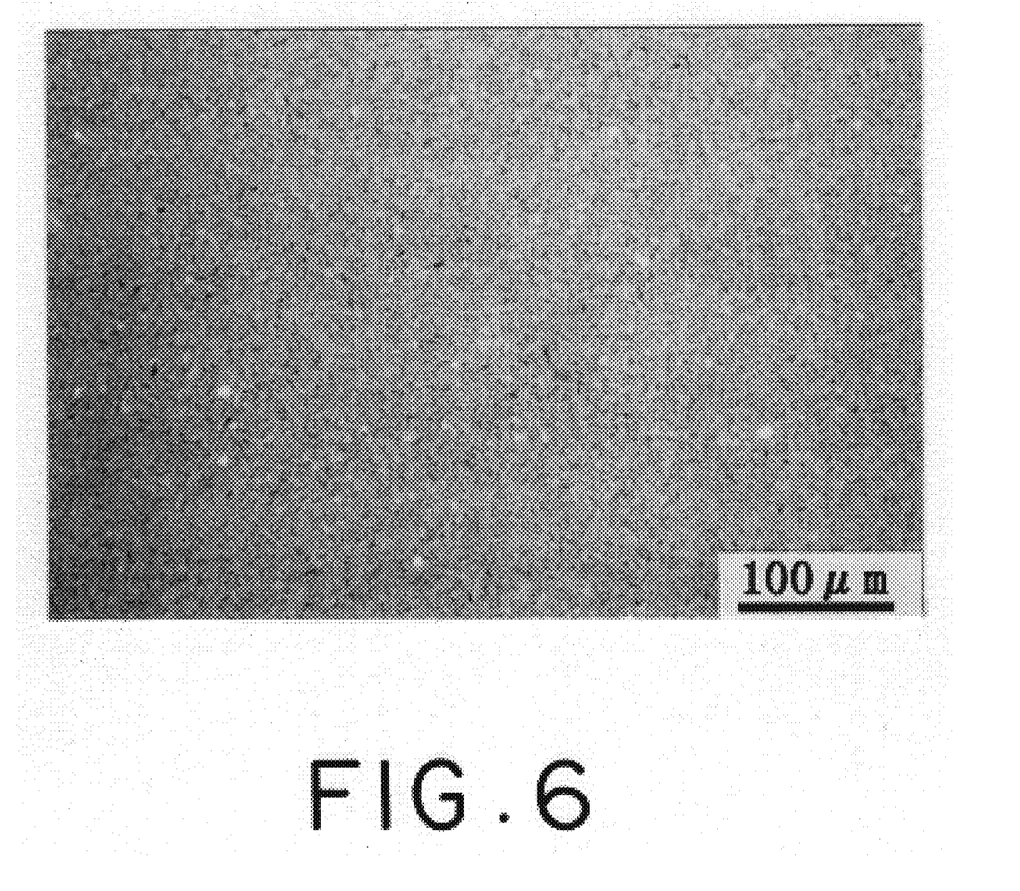
FIG. 6 is a photograph of etched surface of the porous silicon nitride (a photograph of the texture of the ceramic material) in a conventional example.

FIG. 6 is a photograph of a polished and etched cross section of the silicon nitride sinter obtained above. No pores are present when α-type silicon nitride is used as a raw material, and this material is the same as a conventional dense sinter.

Table 1 shows the properties of the porous silicon nitrides of Examples 1, 2 and the dense silicon nitride of the comparative example. As is clear from Table 1, the porous silicon nitride of the examples retains its strength despite containing pores and having a lowered modulus of elasticity. The strength is particularly increased with the porous material of Example 1 compared to the dense silicon nitride sinter of the comparative example. It was found that this allows the breaking strain to be greatly increased.

TABLE 1

|  | Density (g/cm²) | Porosity (%) | Modulus (GPa) | Flexural strength (MPa) | Breaking strain (* 10⁻³) |
|---|---|---|---|---|---|
| Ex. 1 | 2.783 | 14.4 | 215 | 1098 | 5.11 |
| Ex. 2 | 2.859 | 12.1 | 244 | 810 | 3.31 |
| Comp. Ex. | 3.245 | 0.1 | 330 | 1051 | 3.18 |

As discussed in detail above, the present invention relates to a porous silicon nitride, characterized by having a structure in which rodlike grains of silicon nitride are oriented in a single direction, and the rest of the structure other than the rodlike grains consists solely of pores, and also relates to a method for producing the above-mentioned porous silicon nitride, characterized in the processes that comprises of forming a raw material consisting only of silicon nitride rodlike particles and a small amount of a rodlike particles binding auxiliary that serves as a binder during sintering into a tape with a thickness of 5 to 1000 μm by sheet forming or extrusion forming, laminating it, and sintered the laminate in a nitrogen atmosphere.

The porous silicon nitride obtained with the present invention retains its strength and has a decreased modulus of elasticity, and therefore the strain up to fracture is greatly increased and there is much higher tolerance with respect to strain and stress than with an ordinary dense silicon nitride ceramic. The porous silicon nitride of the present invention can be easily incorporated into a mechanism which requires mechanical strength and in which there is a marked difference in the coefficient of thermal expansion and the modulus of elasticity between different members. Also, it is possible to take advantage of the low density resulting from the pores contained in the material, and use this material favorably as a rotary machine part in which the density of the material directly affects the centrifugal stress that is generated, such as a gas turbine.

We claim:

1. A high-strength porous silicon nitride having a decreased modulus of elasticity, and having a microstructure which comprises elongated silicon nitride grains oriented in a single direction and obtained from rod shaped particles of silicon nitride with a minor diameter of 0.5 to 10 μm and an aspect ratio of 10 to 100, and sintering additives, and wherein, other than said grains, said silicon nitride consists solely of pores having a shape elongated in the same orientation direction as said grains, and wherein said silicon nitride has a porosity of 5 to 30%.

2. The high-strength porous silicon nitride according to claim 1, which is produced by a process comprising mixing rod shaped particles of silicon nitride with a minor diameter of 0.5 to 10 μm and an aspect ratio of 10 to 100 with sintering additives, forming the mixture into a tape in which the silicon nitride rodlike particles are oriented in a single direction, laminating the tape to prepare a compact, calcining the compact to burn off organic compounds thereof, and then sintering the thus obtained product in a nitrogen atmosphere.

3. The high-strength porous silicon nitride according to claim 2, wherein said forming is carried out by tape casting or extrusion forming.

* * * * *